(12) United States Patent
Pernia

(10) Patent No.: US 9,132,719 B1
(45) Date of Patent: Sep. 15, 2015

(54) CLIP-ON SWINGABLE VEHICLE VISOR FOR PROVIDING SIMULTANEOUS MULTIDIMENSIONAL SUNSHADE

(71) Applicant: Patrick Pernia, San Jose, CA (US)

(72) Inventor: Patrick Pernia, San Jose, CA (US)

( * ) Notice: Subject to any disclaimer, the term of this patent is extended or adjusted under 35 U.S.C. 154(b) by 0 days.

(21) Appl. No.: 14/287,049

(22) Filed: May 25, 2014

(51) Int. Cl.
  *B60J 3/00* (2006.01)
  *B60J 3/02* (2006.01)

(52) U.S. Cl.
  CPC ............. *B60J 3/0208* (2013.01); *B60J 3/026* (2013.01); *B60J 3/0221* (2013.01); *B60J 3/0265* (2013.01)

(58) Field of Classification Search
  CPC ........ B60J 3/0208; B60J 3/0221; B60J 3/026; B60J 3/0265
  USPC ....................... 296/96.9, 96.7, 96.8
  See application file for complete search history.

(56) References Cited

U.S. PATENT DOCUMENTS

| | | | |
|---|---|---|---|
| 3,961,820 A | | 6/1976 | Spangler |
| 4,580,829 A | * | 4/1986 | Matheopoulos ............. 296/97.6 |
| 5,626,381 A | * | 5/1997 | Gervasoni et al. ........... 296/97.8 |
| 5,673,957 A | * | 10/1997 | Moo et al. .................... 296/97.6 |
| 6,189,947 B1 | | 2/2001 | Annan |
| 6,290,280 B1 | * | 9/2001 | Riekse ......................... 296/97.6 |
| 7,556,308 B2 | * | 7/2009 | Lee et al. ..................... 296/97.9 |
| 2009/0058125 A1 | | 3/2009 | Mac |
| 2011/0101725 A1 | | 5/2011 | Mac |

* cited by examiner

*Primary Examiner* — Pinel Romain
(74) *Attorney, Agent, or Firm* — Invent Capture, LLC.; Samuel S. Cho

(57) ABSTRACT

A clip-on swingable vehicle visor that clips onto a standard in-car sun visor provides sunshade to a dimension not currently covered by the standard in-car sun visor. For example, if the standard in-car sun visor partly covers a front windshield, the clip-on swingable vehicle visor can swing sideways to cover a portion of a driver's side window, thereby creating a novel structure that provides simultaneous multi-dimensional sunshades for both the front windshield and the driver's side window. Similarly, if the standard in-car sun visor is swung sideways to cover a portion of the driver's side window, the clip-on swingable vehicle visor can swing away from the current position of the standard in-car sun visor to cover a portion of the front windshield. The clip-on swingable vehicle visor can also be folded and stored on top of the standard in-car sun visor.

17 Claims, 7 Drawing Sheets

CLIP-ON SWINGABLE VEHICLE VISOR FOR PROVIDING SIMULTANEOUS MULTIDIMENSIONAL SUNSHADE

BACKGROUND OF THE INVENTION

The present invention generally relates to a sun visor. More specifically, the present invention relates to various embodiments of swingable vehicle visors that are attachable to standard in-car sun visors.

Most vehicles on the road today are equipped with standard in-car sun visors. Typically, a standard in-car sun visor provides partial sun blockage or sunshade to an upper portion of a front windshield in a vehicle. Furthermore, the standard in-car sun visor can swing around to a side window to also provide a partial sun blockage or sunshade to an upper portion of the side window. Most vehicles have at least one standard in-car sun visor for a driver's seat and a front passenger seat.

However, the standard in-car sun visor is incapable of providing sun blockage or sunshade to two or more dimensions at the same time. For example, a driver who is making a turn is often inconvenienced by a blinding sunlight that is shining from a different direction during or after the turn. In such situations, the driver compromises safety by facing the blinding sunlight while changing directions, or by attempting to swing the standard in-car sun visor around (e.g. from the front windshield to the driver's side window, or vice versa) while changing directions. The standard in-car sun visor's inability to provide sun block or sunshade to two or more dimensions simultaneously is an inherent and significant safety risk and a user inconvenience to many drivers today.

There have been some attempts to resolve this inconvenience in the past. For example, attachable sunshades with air suction cups is widely available in the car accessory market today. These conventional aftermarket sunshade products typically attach to a side window of a vehicle to provide sun blockage or sunshade. However, if the driver or the front passenger of the vehicle accidentally opens the side window attached with a conventional aftermarket sunshade with air suction cups, the conventional aftermarket sunshade can be abruptly dislocated or dislodged from the side window, thereby introducing additional inconvenience and even safety risks associated with the abruptly-dislodged aftermarket sunshade. Furthermore, the vehicle's interior may be also damaged by accidental opening of the side window attached with the conventional aftermarket sunshade.

Therefore, it may be advantageous to provide a novel vehicle visor that does not dislocate or dislodge even when a side window is opened or closed. Furthermore, it may also be advantageous to provide a novel vehicle visor that attaches to an existing standard in-car sun visor to form a unique multi-dimensional sun visor structure that can provide simultaneous multidimensional sun blockage or sunshade while in use. In addition, it may also be advantageous to provide a novel vehicle visor that can be folded or stored together with the existing standard in-car sun visor while not in use.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a novel clip-on aftermarket swingable vehicle visor is disclosed. This clip-on swingable aftermarket vehicle visor comprises: a supplementary sunshade that blocks or reduces solar intensity; a sunshade latch that attaches the supplementary sunshade securely with one or more sunshade screws puncturing through the supplementary sunshade, or with epoxy materials, wherein the sunshade latch also has a swingable neck on an edge of the sunshade latch; the swingable neck configured to rotate the supplementary sunshade and the sunshade latch on a lateral swing plane when the swingable neck is held together with a neck holder by a vertical pivot going through the swingable neck and the neck holder; and a clip configured to attach to a standard in-car sun visor, wherein the clip also incorporates the neck holder on an edge of the clip to accommodate the lateral swing plane for the supplementary sunshade and the sunshade latch.

Furthermore, in another embodiment of the invention, a novel clip-on aftermarket swingable vehicle visor comprises: a supplementary sunshade and a sunshade latch molded together as a single structural piece, wherein the supplementary sunshade blocks or reduces solar intensity, and wherein the sunshade latch incorporates a swingable neck (e.g. positioned on an edge of the supplementary sunshade); the swingable neck configured to rotate the supplementary sunshade and the sunshade latch on a lateral swing plane when the swingable neck is held together with a neck holder by a vertical pivot going through the swingable neck and the neck holder; and a clip configured to attach to a standard in-car sun visor, wherein the clip also incorporates the neck holder on an edge of the clip to accommodate the lateral swing plane for the supplementary sunshade and the sunshade latch.

DETAILED DESCRIPTION

Figure 1:
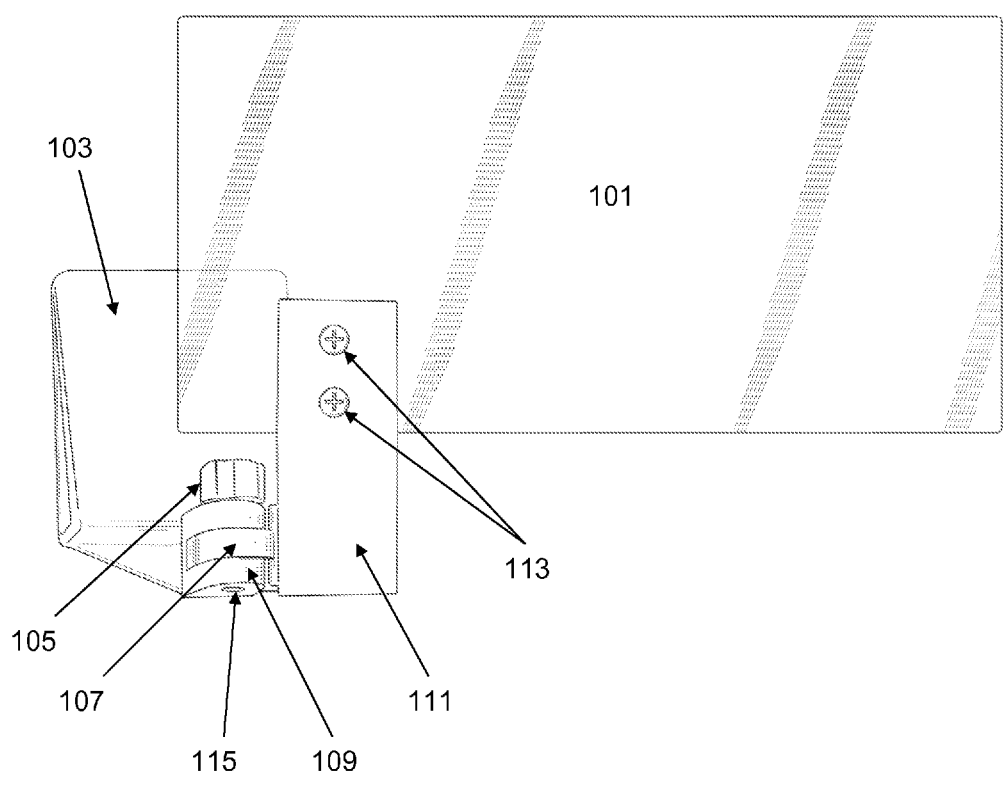
FIG. 1 shows a frontal view of a clip-on swingable vehicle visor in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more clip-on swingable vehicle visors in accordance with another embodiment of the invention. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order and do not imply any limitations in the invention.

One objective of an embodiment of the present invention is to provide a novel vehicle visor that does not dislocate or dislodge even when a side window is opened or closed.

Another objective of an embodiment of the present invention is to provide a novel vehicle visor that attaches to an existing standard in-car sun visor to form a unique multidimensional sun visor structure that can provide simultaneous multidimensional sun blockage or sunshade while in use.

A further objective of an embodiment of the present invention is to provide a novel vehicle visor that can be folded or stored together with the existing standard in-car sun visor while not in use.

For the purpose of describing the invention, a term "visor" is defined as a device which is capable of at least partially reducing or blocking the sun's intensity. For example, a vehicle visor is a device that reduces or blocks the sun's intensity coming through one or more vehicle windows.

Furthermore, for the purpose of describing the invention, a term "sunshade" is defined as a protective covering that reduces or blocks the sun's intensity. In one example, a sunshade can be tinted with a dark color to reduce the sun's intensity while providing some levels of visibility through the sunshade. In another example, a sunshade may be translucent or opaque, and not provide any substantial visibility through the sunshade.

In addition, for the purpose of describing the invention, a term "clip-on" is defined as capable of being attached to an object with a clip. Typically, a clip-on device is easily attachable or detachable to an object by widening or narrowing the width of the clip.

FIG. 1 shows a frontal view (100) of a clip-on swingable vehicle visor in accordance with an embodiment of the invention. In a preferred embodiment of the invention, the clip-on swingable vehicle visor comprises a supplementary sunshade (101), which is attached to a sunshade latch (111) with one or more sunshade screws (113). The supplementary sunshade (101) may be a tinted plastic piece, a translucent plastic piece, an opaque plastic piece, or a piece made from other materials that provide substantial amount of cover from the sun's intensity. As shown in FIG. 1, the sunshade latch (111) also has a swingable neck (107), which is either molded together with the sunshade latch (111), or is attached to the sunshade latch (111).

Furthermore, in the preferred embodiment of the invention, the swingable neck (107) is configured to fit into a neck holder (109), and is also configured to rotate around a vertical pivot (115) that vertically goes through the neck holder (109) and the swingable neck (107), as shown in FIG. 1. In addition, the neck holder (109) is also molded together with a clip (103) or is operatively attached to the clip (103), as shown in FIG. 1. In one embodiment of the invention, the vertical pivot may be attached with a pivot resistance knob (105) to adjust rotation firmness of the swingable neck (107). In another embodiment of the invention, the vertical pivot may not include the pivot resistance knob (105) but provides sufficient and appropriate level of pivot resistance to prevent the swingable neck (107), the sunshade latch (111), and the supplementary sunshade (101) from swinging around the vertical pivot inadvertently when there is no deliberate user input to swing the swingable neck (107).

Continuing with FIG. 1, in the preferred embodiment of the invention, the clip (103) is configured to be clipped onto a standard in-car sun visor. In some embodiments of the invention, the clip (103), the neck holder (109), and the swingable neck (107) may include another axis of rotation other than a laterally-swinging axis of rotation to enable the supplementary sunshade (101) to move to a spot that may not be possible or convenient with the laterally-swinging axis of rotation alone. For example, a horizontal pivot, a second swingable neck, and a second pivot resistance knob can be incorporated between the clip (103) and the sunshade latch (111) to enable the supplementary sunshade (101) to swing vertically (i.e. upwards and downwards) after the clip-on swingable vehicle visor is clipped onto a standard in-car sun visor. Furthermore, in some embodiments of the invention, the supplementary sunshade (101) may be attached to the sunshade latch using epoxy, other glues, or other adhesive materials, instead of utilizing the sunshade screws (113).

In an alternate embodiment of the invention, a supplementary sunshade and a sunshade latch may be molded together as a single structural piece. In one example, this single structural piece may be a plastic mold that incorporates both the supplementary shade and the sunshade latch. Furthermore, the sunshade latch may also incorporate a swingable neck positioned or aligned on an edge of the supplementary sunshade. In this embodiment of the invention, this swingable neck is configured to rotate the supplementary sunshade and the sunshade latch on a lateral swing plane when the swingable neck is held together with a neck holder by a vertical pivot going through the swingable neck and the neck holder. In addition, a clip configured to attach to a standard in-car sun visor also incorporates the neck holder on an edge of the clip to accommodate the lateral swing plane for the supplementary sunshade and the sunshade latch.

Figure 2:
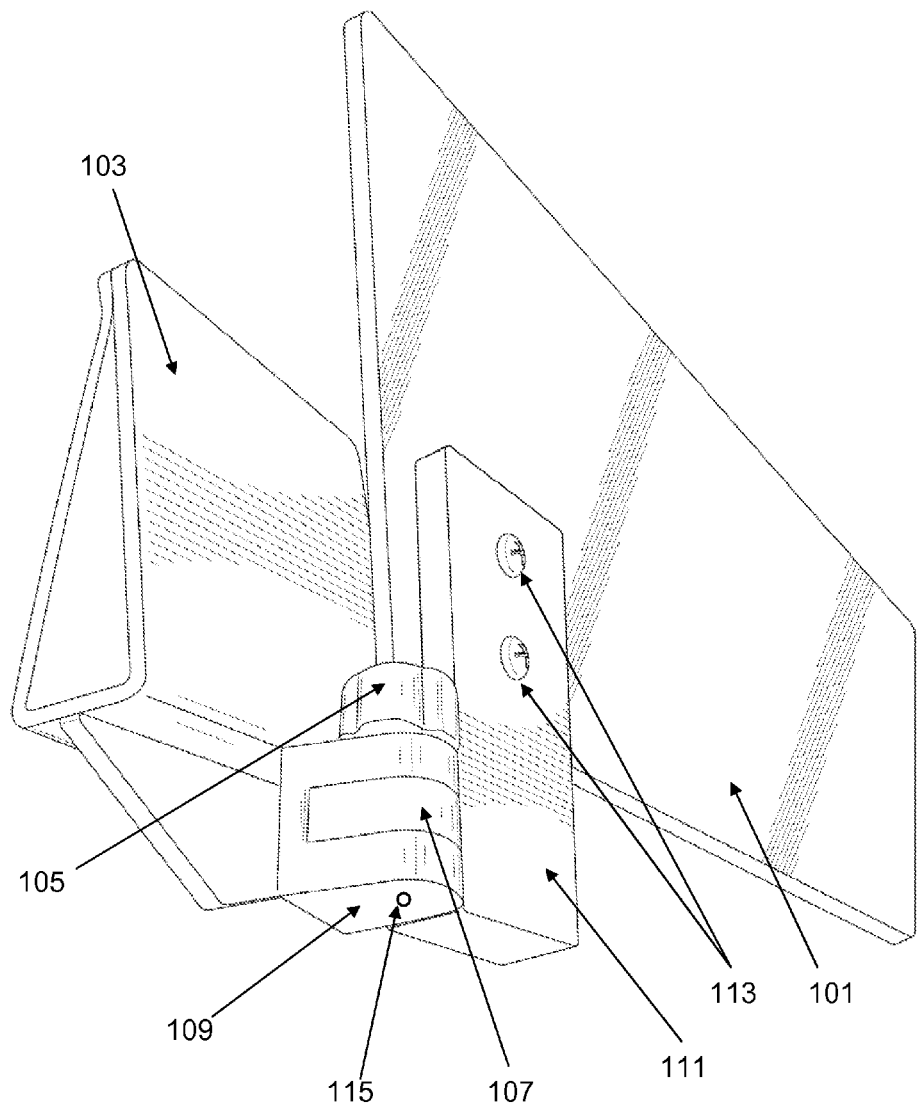
FIG. 2 shows a perspective side view of a clip-on swingable vehicle visor in accordance with an embodiment of the invention.

FIG. 2 shows a perspective side view (200) of the clip-on swingable vehicle visor in accordance with an embodiment of the invention. In the preferred embodiment of the invention, the supplementary sunshade (101) may be rectangular in shape. In another embodiment of the invention, the supplementary sunshade (101) may be trapezoidal in shape or may embody another shape that provides effective reduction or blockage of the sun's intensity.

As shown in FIG. 2, the sunshade latch (111) may attach the supplementary sunshade (101) with one or more sunshade screws (113). In other embodiments of the invention, the supplementary sunshade (101) may be attached to the sunshade latch using epoxy, other glues, or other adhesive materials, instead of utilizing the sunshade screws (113). Preferably, the supplementary sunshade (101) is made of a tinted plastic piece, so that a driver or a front passenger can see through the supplementary sunshade (101) with sufficient reduction of the sun's intensity through the tinted plastic piece. In one example, fifty to eighty percent reduction of the sun's intensity can be considered to be "sufficient" reduction for a vehicle visor application. However, in some applications, a complete or near-complete blockage (e.g. ninety to one hundred percent reduction) of the sun's intensity may be desired. For those applications, a translucent plastic piece, an opaque plastic piece, or another piece made from other materials that provide either translucency or opaqueness may be highly desirable.

As shown in the perspective side view (200) in FIG. 2, the sunshade latch (111) also has the swingable neck (107), which is either molded together with the sunshade latch (111), or is attached to the sunshade latch (111). The sunshade latch (111) and the swingable neck (107) may be made of plastic, metallic materials, or composite materials, depending on the material cost vs. benefit tradeoff and the desirability of utilizing specific materials for durability, thermal deformity resistance, safety, and weight reduction. Furthermore, in the preferred embodiment of the invention, the swingable neck (107) can be situated between the neck holder (109), and is also configured to rotate around a vertical pivot (115) that vertically goes through the neck holder (109) and the swingable neck (107), as shown in FIG. 2.

In addition, the neck holder (109) is also molded together with the clip (103) or is operatively attached to the clip (103), as shown in FIG. 2. In one embodiment of the invention, the vertical pivot may be attached with the pivot resistance knob (105) to adjust rotation firmness of the swingable neck (107). If the pivot resistance knob (105) is turned to the highest firmness setting, the swingable neck (107) may not move at all even if the user places deliberate force to rotate the supplementary sunshade (101). On the other hand, if the pivot resistance knob (105) is turned to the lowest firmness setting, the swingable neck (107) may move around the vertical pivot very easily with a minimal user force.

In another embodiment of the invention, the vertical pivot may not include the pivot resistance knob (105), and may simply operate with the swingable neck (107) and the neck holder (109). In these embodiments, the vertical pivot may still provide sufficient and appropriate level of pivot resistance to prevent the swingable neck (107), the sunshade latch (111), and the supplementary sunshade (101) from inadvertently swinging around the vertical pivot when there is no deliberate user input to swing the swingable neck (107).

Continuing with FIG. 2, in the preferred embodiment of the invention, the clip (103) can be clipped onto a standard in-car sun visor located on a driver's side or a front passenger side. Furthermore, the clip (103) can be attached to any corner or any edge on the standard in-car sun visor. In some cases, the clip (103) may even be attached to another structure in a vehicle interior, such as a roof grab handle or another suitable structure that can attach the clip-on swingable vehicle visor.

In some embodiments of the invention, the clip (103), the neck holder (109), and the swingable neck (107) may include another axis of rotation other than a laterally-swinging axis of rotation to position the supplementary sunshade (101) to a spot that could not be reached with the laterally-swinging axis of rotation alone. For example, a horizontal pivot, a second swingable neck, and a second pivot resistance knob can be incorporated between the clip (103) and the sunshade latch (111) to enable the supplementary sunshade (101) to swing vertically (i.e. upwards and downwards) after the clip-on swingable vehicle visor is clipped onto a standard in-car sun visor. In another example, another pivot that enables the supplementary sunshade (101) to swing at a different swing plane may be incorporated.

Figure 3:
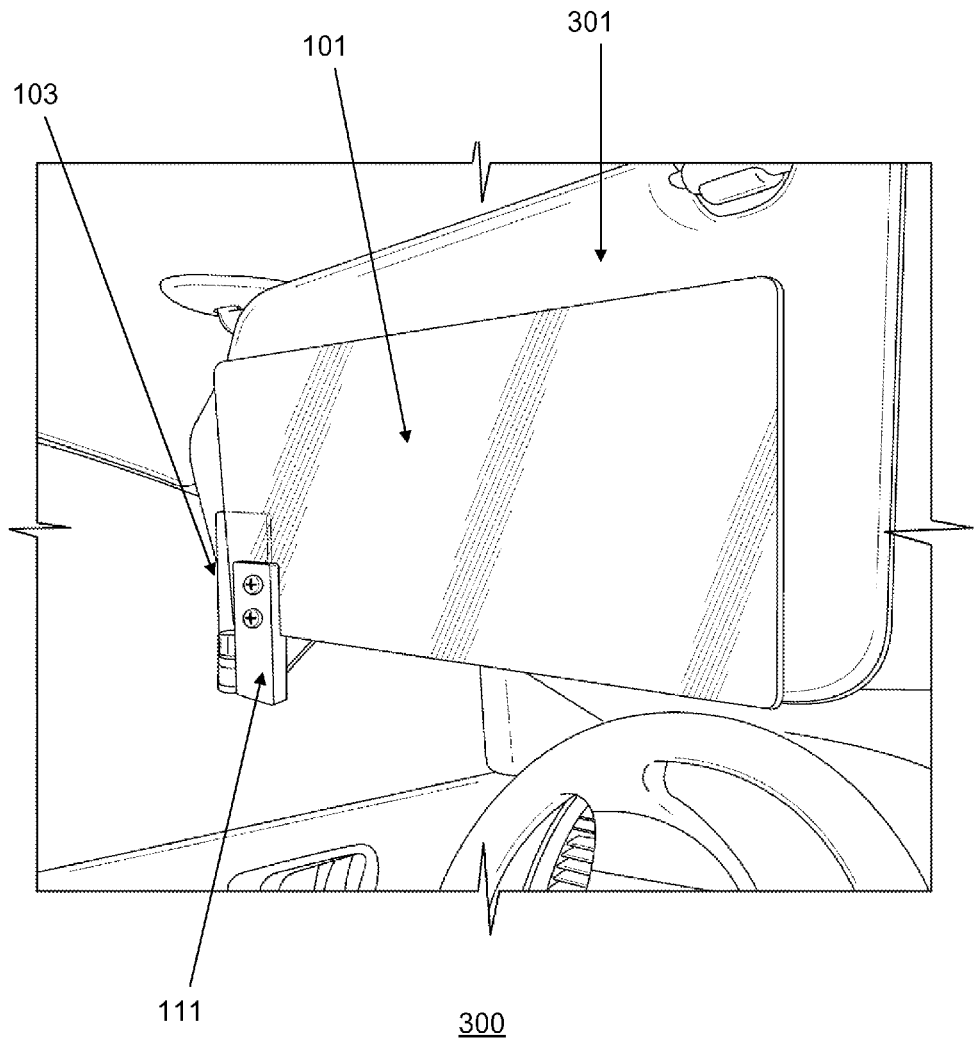
FIG. 3 shows a vehicle interior view of a clip-on swingable vehicle visor clipped onto a standard in-car sun visor while the clip-on swingable vehicle visor is in a folded position on top of the standard in-car sun visor, in accordance with an embodiment of the invention.

FIG. 3 shows a vehicle interior view (300) of a clip-on swingable vehicle visor clipped onto a standard in-car sun visor (301) while the clip-on swingable vehicle visor is in a folded position on top of the standard in-car sun visor (301), in accordance with an embodiment of the invention. In this vehicle interior view (300), the clip-on swingable vehicle visor is shown with a supplementary sunshade (101), a sunshade latch (111) attached to the supplementary sunshade (101), and a clip (103) that is clipped onto the standard in-car sun visor (301). As described previously for FIG. 1 and FIG. 2, in the preferred embodiment of the invention, the sunshade latch (111) also incorporates a swingable neck that can rotate around a vertical pivot, which goes through the swingable neck and a neck holder element on the clip (103).

Furthermore, in the embodiment of the invention as shown in FIG. 3, the clip-on swingable vehicle visor is clipped onto a lower left corner of the standard in-car sun visor (301) on the driver's side. In another embodiment of the invention, the clip-on swingable vehicle visor may be clipped onto an upper left corner, an upper right corner, or a lower right corner of the standard in-car sun visor (301). Yet in another embodiment of the invention, the clip-on swingable vehicle visor may be clipped onto a standard in-car sun visor on the front passenger side or onto another standard in-car sun visor in the vehicle.

One of the advantages of the present invention is that the clip-on swingable vehicle visor can be seamlessly and neatly stored on top of a standard in-car sun visor, as shown in the vehicle interior view (300) in FIG. 3, when the clip-on swingable vehicle visor is not in use. This "folded position" for the clip-on swingable vehicle visor clearly differentiates various embodiments of the present invention from conventional air suction cup-based aftermarket sunshades, which need to be physically removed from a window for storage. With the clip-on swingable vehicle visor as disclosed for various embodiments of the present invention, a driver does not have to put away an aftermarket sunshade, only to look for the aftermarket sunshade inside the vehicle subsequently, because the clip-on swingable vehicle visor can always be conveniently folded on top of the standard in-car sun visor. Furthermore, unlike conventional air suction cup-based aftermarket sunshades, which can be dislocated or dislodged in case of side windows opening or closing, the clip-on swingable vehicle visor enables the side windows to operate at all times without risking dislocation or dislodging of the supplementary sunshade (101).

Figure 4:
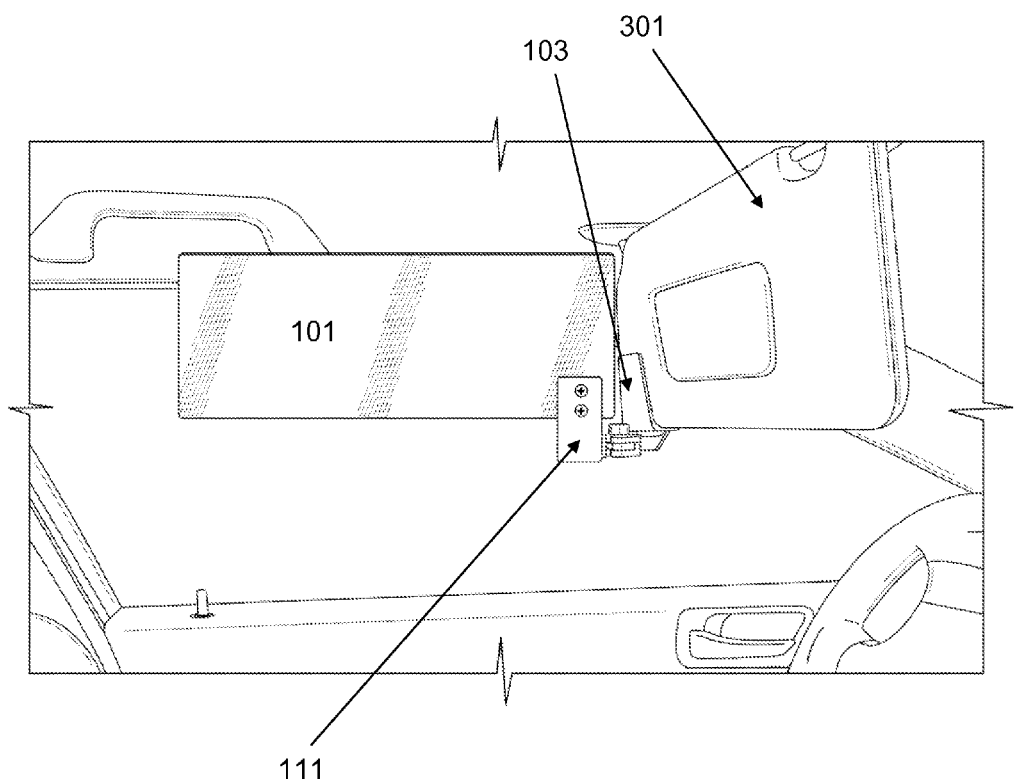
FIG. 4 shows a vehicle interior view of a clip-on swingable vehicle visor that clipped onto a standard in-car sun visor and is swung laterally in an extended position to provide sun blockage or sunshade to a driver's side window when the standard in-car sun visor is covering an upper portion of a front windshield, in accordance with an embodiment of the invention.

FIG. 4 shows a vehicle interior view (400) of a clip-on swingable vehicle visor that clipped onto a standard in-car sun visor (301) and is swung laterally in an extended position to provide sun blockage or sunshade to a driver's side window when the standard in-car sun visor (301) is covering an upper portion of a front windshield, in accordance with an embodiment of the invention. In this vehicle interior view (400), the clip-on swingable vehicle visor is shown with a supplementary sunshade (101) attached to a sunshade latch (111), which is swung laterally to cover an upper portion of the driver's side window. Furthermore, in this vehicle interior view (400), the clip-on swingable vehicle visor is shown with a clip (103) that has been attached to a lower left corner of the standard in-car sun visor (301).

Furthermore, FIG. 4 illustrates the "extended position" of the clip-on swingable vehicle visor, which is swung around a vertical pivot to provide a sun block for the driver's side window while the standard in-car sun visor (301) is simultaneously covering a portion of the front windshield. If the supplementary sunshade (101) is made of tinted plastic, the clip-on swingable vehicle visor may still provide some good level of visibility to the driver through the supplementary sunshade (101), while substantially reducing the sun's intensity for more comfortable and safer driving.

As shown by the extended position of the clip-on swingable vehicle visor in FIG. 4, various embodiments of the present invention provide fundamental safety advantages to the driver. One advantage is that the driver's attention is not taken away by attempting to swing the standard in-car sun visor while turning around corners or changing directions. Another advantage is that the driver's attention is also not taken away by attempting to attach or remove a conventional aftermarket sunshade that utilizes air suction cups during driving. Furthermore, another advantage is that the driver can operate a side window without being required to remove anything from the side window, even if the driver desires to have a secondary sunshade that covers the driver's side window. Therefore, the clip-on swingable vehicle visor, in accordance with various embodiments of the present invention, is significantly more beneficial for the driver's safety, while also being more convenient than conventional aftermarket sunshades.

Figure 5:
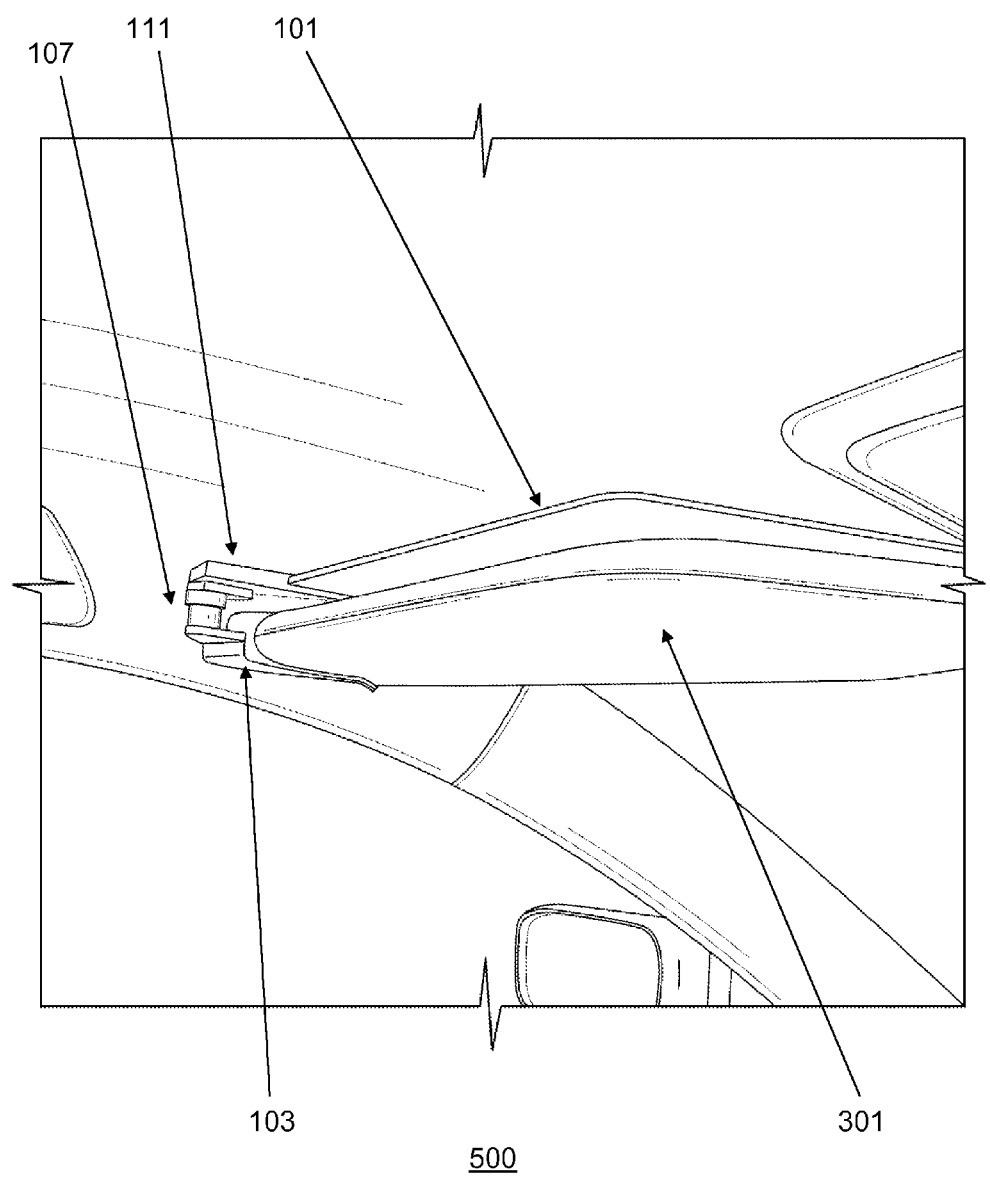
FIG. 5 shows another vehicle interior view of a clip-on swingable vehicle visor clipped onto a standard in-car sun visor while the clip-on swingable vehicle visor is in a folded position on top of the standard in-car sun visor, in accordance with an embodiment of the invention.

FIG. 5 shows another vehicle interior view (500) of a clip-on swingable vehicle visor clipped onto a standard in-car sun visor (301) while the clip-on swingable vehicle visor is in a folded position on top of the standard in-car sun visor (301), in accordance with an embodiment of the invention. In this vehicle interior view (500), the clip-on swingable vehicle visor is shown with a supplementary sunshade (101), a sunshade latch (111) attached to the supplementary sunshade (101), a clip (103) that is clipped onto the standard in-car sun visor (301), and a swingable neck (107) located between the sunshade latch (111) and the clip (103). Preferably, the sunshade latch (111) incorporates the swingable neck (107) that can rotate around a vertical pivot, which goes through the swingable neck (107) and a neck holder element on the clip (103).

Furthermore, in the embodiment of the invention as shown in FIG. 5, the clip-on swingable vehicle visor is clipped onto a lower left corner of the standard in-car sun visor (301) on the driver's side. In another embodiment of the invention, the clip-on swingable vehicle visor may be clipped onto an upper left corner, an upper right corner, or a lower right corner of the standard in-car sun visor (301). Yet in another embodiment of the invention, the clip-on swingable vehicle visor may be clipped onto a standard in-car sun visor on the front passenger side or onto another standard in-car sun visor in the vehicle. As shown in the vehicle interior view (500) in FIG. 5, the clip-on swingable vehicle visor can be seamlessly and neatly folded to be stored on top of a standard in-car sun visor, when the clip-on swingable vehicle visor is not in use. Furthermore, the clip-on swingable vehicle visor and the standard in-car sun visor can stay attached together at all times, whether the clip-on swingable vehicle visor and the standard in-car sun visor are currently in use or not. For example, after the clip-on swingable vehicle visor and the standard in-car sun visor are utilized together to provide simultaneous sunshade for the front windshield and the driver's side window, they can be put away, folded, and stored together on a normal ceiling hold position of the standard in-car sun visor. This "folded position" for the clip-on swingable vehicle visor clearly differentiates various embodiments of the present invention from conventional air suction cup-based aftermarket sunshades, which need to be physically removed from a window for storage.

Figure 6:
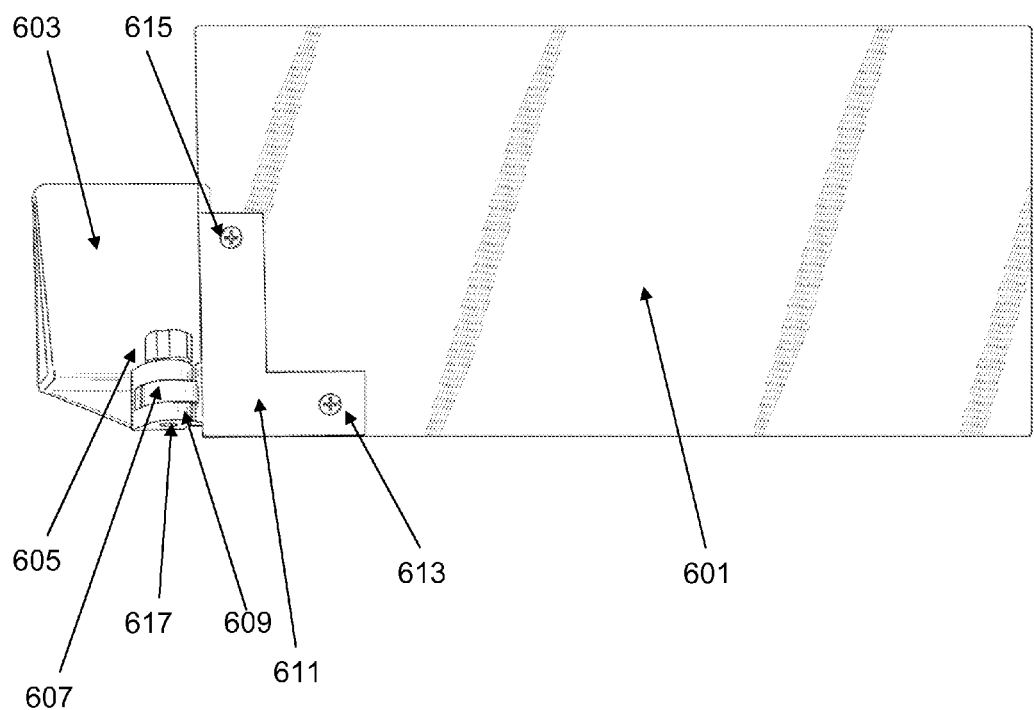
FIG. 6 shows a frontal view of a clip-on swingable vehicle visor in accordance with another embodiment of the invention.

FIG. 6 shows a frontal view (600) of a clip-on swingable vehicle visor in accordance with another embodiment of the invention. In this embodiment of the invention, the clip-on swingable vehicle visor comprises a supplementary sunshade (601), which is attached to an L-shaped sunshade latch (611) with one or more sunshade screws (613, 615). The supplementary sunshade (601) may be a tinted plastic piece, a translucent plastic piece, an opaque plastic piece, or a piece made from other materials that provide substantial amount of cover from the sun's intensity. As shown in FIG. 6, the L-shaped sunshade latch (611) is positioned on a corner of the supplementary sunshade (601), and also has a swingable neck (607), which is either molded together with the L-shaped sunshade latch (611), or is attached to the L-shaped sunshade latch (611).

Furthermore, in the preferred embodiment of the invention, the swingable neck (607) is configured to fit into a neck holder (609), and is also configured to rotate around a vertical pivot (617) that vertically goes through the neck holder (609) and the swingable neck (607), as shown in FIG. 6. In addition, the neck holder (609) is also molded together with a clip (603) or is operatively attached to the clip (603), as shown in FIG. 6. In one embodiment of the invention, the vertical pivot may be attached with a pivot resistance knob (605) to adjust rotation firmness of the swingable neck (607). In another embodiment of the invention, the vertical pivot may not include the pivot resistance knob (605) but provides sufficient and appropriate level of pivot resistance to prevent the swingable neck (607), the L-shaped sunshade latch (611), and the supplementary sunshade (601) from swinging around the vertical pivot inadvertently when there is no deliberate user input to swing the swingable neck (607).

Continuing with FIG. 6, in the preferred embodiment of the invention, the clip (603) is configured to be clipped onto a standard in-car sun visor. In some embodiments of the invention, the clip (603), the neck holder (609), and the swingable neck (607) may include another axis of rotation other than a laterally-swinging axis of rotation to enable the supplementary sunshade (601) to move to a spot that may not be possible or convenient with the laterally-swinging axis of rotation alone. For example, a horizontal pivot, a second swingable neck, and a second pivot resistance knob can be incorporated between the clip (603) and the L-shaped sunshade latch (611) to enable the supplementary sunshade (601) to swing vertically (i.e. upwards and downwards) after the clip-on swingable vehicle visor is clipped onto a standard in-car sun visor. Furthermore, in some embodiments of the invention, the supplementary sunshade (601) may be attached to the L-shaped sunshade latch (611) using epoxy, other glues, or other adhesive materials, instead of utilizing the sunshade screws (613, 615).

Figure 7:
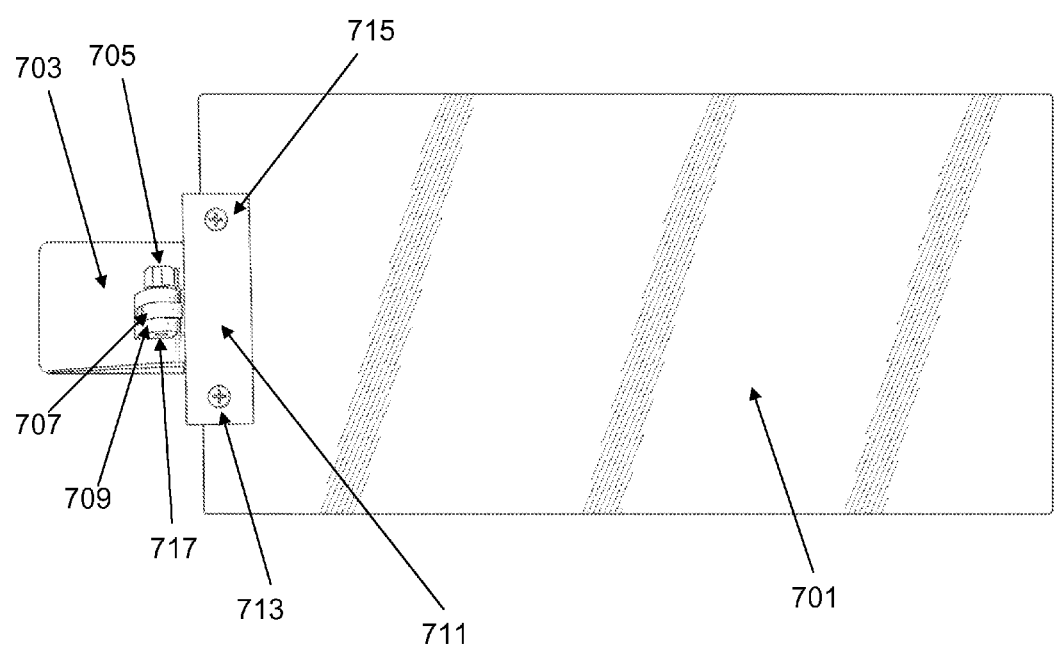
FIG. 7 shows a frontal view of a clip-on swingable vehicle visor in accordance with another embodiment of the invention.

FIG. 7 shows a frontal view (700) of a clip-on swingable vehicle visor in accordance with another embodiment of the invention. In this embodiment of the invention, the clip-on swingable vehicle visor comprises a supplementary sunshade (701), which is attached to an edge-centered sunshade latch (711) with one or more sunshade screws (713, 715). In this embodiment of the invention, the edge-centered sunshade latch (711) positions the clip (703) in the middle of an edge of the clip-on swingable vehicle visor. Because the clip (703) is positioned in the middle of the edge, this embodiment of the clip-on swingable vehicle visor can be best attached to a side edge of the standard in-car sun visor, as opposed to a lower corner of the standard in-car sun visor.

The supplementary sunshade (701) may be a tinted plastic piece, a translucent plastic piece, an opaque plastic piece, or a piece made from other materials that provide substantial amount of cover from the sun's intensity. As shown in FIG. 7, the edge-centered sunshade latch (711) is positioned in the middle of an edge on the supplementary sunshade (701), and also has a swingable neck (707), which is either molded together with the edge-centered sunshade latch (711), or is attached to the edge-centered sunshade latch (711).

Furthermore, in the preferred embodiment of the invention, the swingable neck (707) is configured to fit into a neck holder (709), and is also configured to rotate around a vertical pivot (717) that vertically goes through the neck holder (709) and the swingable neck (707), as shown in FIG. 7. In addition, the neck holder (709) is also molded together with a clip (703) or is operatively attached to the clip (703), as shown in FIG. 7. In one embodiment of the invention, the vertical pivot may be attached with a pivot resistance knob (705) to adjust rotation firmness of the swingable neck (707). In another embodiment of the invention, the vertical pivot may not include the pivot resistance knob (705) but provides sufficient and appropriate level of pivot resistance to prevent the swingable neck (707), the edge-centered sunshade latch (711), and the supplementary sunshade (701) from swinging around the vertical pivot inadvertently when there is no deliberate user input to swing the swingable neck (707).

Continuing with FIG. 7, in the preferred embodiment of the invention, the clip (703) is configured to be clipped onto a standard in-car sun visor. In some embodiments of the invention, the clip (703), the neck holder (709), and the swingable neck (707) may include another axis of rotation other than a laterally-swinging axis of rotation to enable the supplementary sunshade (701) to move to a spot that may not be possible or convenient with the laterally-swinging axis of rotation alone. For example, a horizontal pivot, a second swingable neck, and a second pivot resistance knob can be incorporated between the clip (703) and the edge-centered sunshade latch (711) to enable the supplementary sunshade (701) to swing vertically (i.e. upwards and downwards) after the clip-on swingable vehicle visor is clipped onto a standard in-car sun visor. Furthermore, in some embodiments of the invention, the supplementary sunshade (701) may be attached to the edge-centered sunshade latch (711) using epoxy, other glues, or other adhesive materials, instead of utilizing the sunshade screws (713, 715).

Various embodiments of the present invention, as described above, provide several advantages over conventional aftermarket sunshades. For example, a novel clip-on swingable vehicle visor in accordance with an embodiment of the invention reduces driver distraction and improves driver and passenger safety by not requiring the driver to manually remove an aftermarket sunshade attached to a side window before the window is opened or closed. Because the novel clip-on swingable vehicle visor does not dislocate or dislodge even when a side window is opened or closed, the present invention also provides additional user convenience while reducing the driver distraction.

Furthermore, a novel clip-on swingable vehicle visor, in accordance with an embodiment of the invention, forms a unique multidimensional sun visor structure that can provide simultaneous multidimensional sun blockage or sunshade while in use, and be folded or stored together with the existing standard in-car sun visor while not in use.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A clip-on aftermarket swingable vehicle visor comprising:
   a supplementary sunshade that blocks or reduces solar intensity;
   a sunshade latch that attaches the supplementary sunshade securely with one or more sunshade screws puncturing through the supplementary sunshade, or with epoxy materials, wherein the sunshade latch also has a swingable neck on an edge of the sunshade latch;
   the swingable neck configured to rotate the supplementary sunshade and the sunshade latch on a lateral swing plane when the swingable neck is held together with a neck holder by a vertical pivot going through the swingable neck and the neck holder;
   a clip configured to attach to a standard in-car sun visor, wherein the clip also incorporates the neck holder to accommodate the lateral swing plane for the supplementary sunshade and the sunshade latch; and
   a pivot resistance knob attached to the vertical pivot to control a firmness level of a rotating movement of the swingable neck.

2. The clip-on aftermarket swingable vehicle visor of claim 1, wherein the supplementary sunshade is tinted to reduce the solar intensity while allowing some visibility through the supplementary sunshade.

3. The clip-on aftermarket swingable vehicle visor of claim 1, wherein the supplementary sunshade is opaque to block the solar intensity without allowing any visibility through the supplementary sunshade.

4. The clip-on aftermarket swingable vehicle visor of claim 1, wherein the supplementary sunshade is swung laterally to an extended position to cover a portion of a driver's side window or a passenger's side window while the standard in-car sun visor covers an upper portion of a front windshield.

5. The clip-on aftermarket swingable vehicle visor of claim 1, wherein the standard in-car sun visor is swung laterally to cover a portion of a driver's side window or a passenger's side window while the supplementary sunshade is swung away from the standard in-car sun visor to cover an upper portion of a front windshield.

6. The clip-on aftermarket swingable vehicle visor of claim 1, wherein the supplementary sunshade is folded on top of the standard in-car sun visor in a folded position for convenient storage with the standard in-car sun visor when the clip-on aftermarket swingable vehicle visor is not in use for blocking or reducing the solar intensity.

7. The clip-on aftermarket swingable vehicle visor of claim 1, wherein the supplementary sunshade is rectangular in shape.

8. The clip-on aftermarket swingable vehicle visor of claim 1, wherein the sunshade latch is an L-shape latch, which is attached to a corner of the supplementary sunshade.

9. The clip-on aftermarket swingable vehicle visor of claim 1, wherein the sunshade latch is a rectangular-shape latch, which is attached to an edge of the supplementary sunshade.

10. The clip-on aftermarket swingable vehicle visor of claim 1, wherein the sunshade latch is an edge-centered sunshade latch that positions the clip to a middle of an edge of the standard in-car sun visor.

11. A clip-on aftermarket swingable vehicle visor comprising:
    a supplementary sunshade and a sunshade latch molded together as a single structural piece, wherein the supplementary sunshade blocks or reduces solar intensity, and wherein the sunshade latch incorporates a swingable neck;

the swingable neck configured to rotate the supplementary sunshade and the sunshade latch on a lateral swing plane when the swingable neck is held together with a neck holder by a vertical pivot going through the swingable neck and the neck holder; and a clip configured to attach to a standard in-car sun visor, wherein the clip also incorporates the neck holder to accommodate the lateral swing plane for the supplementary sunshade and the sunshade latch.

12. The clip-on aftermarket swingable vehicle visor of claim 11, further comprising a pivot resistance knob attached to the vertical pivot to control a firmness level of a rotating movement of the swingable neck.

13. The clip-on aftermarket swingable vehicle visor of claim 11, wherein the supplementary sunshade is tinted to reduce the solar intensity while allowing some visibility through the supplementary sunshade.

14. The clip-on aftermarket swingable vehicle visor of claim 11, wherein the supplementary sunshade is opaque to block the solar intensity without allowing any visibility through the supplementary sunshade.

15. The clip-on aftermarket swingable vehicle visor of claim 11, wherein the supplementary sunshade is swung laterally to an extended position to cover a portion of a driver's side window or a passenger's side window while the standard in-car sun visor covers an upper portion of a front windshield.

16. The clip-on aftermarket swingable vehicle visor of claim 11, wherein the standard in-car sun visor is swung laterally to cover a portion of a driver's side window or a passenger's side window while the supplementary sunshade is swung away from the standard in-car sun visor to cover an upper portion of a front windshield.

17. The clip-on aftermarket swingable vehicle visor of claim 11, wherein the supplementary sunshade is folded on top of the standard in-car sun visor in a folded position for convenient storage with the standard in-car sun visor when the clip-on aftermarket swingable vehicle visor is not in use for blocking or reducing the solar intensity.

* * * * *